(12) United States Patent
Nelson

(10) Patent No.: US 6,185,862 B1
(45) Date of Patent: Feb. 13, 2001

(54) CAPTURING DEVICE FOR INSECTS

(75) Inventor: David Nelson, Ashville, NC (US)

(73) Assignee: David W. Nelson, Ashville, NC (US)

( * ) Notice: Under 35 U.S.C. 154(b), the term of this patent shall be extended for 0 days.

(21) Appl. No.: 09/246,543

(22) Filed: Feb. 8, 1999

Related U.S. Application Data

(63) Continuation-in-part of application No. 08/832,384, filed on Apr. 2, 1997, now abandoned.

(51) Int. Cl.$^7$ .............................. A01M 3/02; A01M 3/04
(52) U.S. Cl. ................................. 43/136; 43/137
(58) Field of Search .............................. 43/114, 115, 116, 43/117, 136, 137

(56) References Cited

U.S. PATENT DOCUMENTS

| | | | | |
|---|---|---|---|---|
| 417,400 | * | 12/1889 | Thum | 43/114 |
| 486,138 | * | 11/1892 | Thum | 43/114 |
| 800,354 | * | 9/1905 | Boyd | 43/114 |
| 988,003 | * | 3/1911 | Lord | 43/114 |
| 2,911,756 | * | 11/1959 | Geary | 43/114 |
| 2,962,836 | * | 12/1960 | Hughes | 43/114 |
| 3,449,856 | * | 6/1969 | Weaver | 43/136 |
| 3,816,956 | * | 6/1974 | Sekula | 43/114 |
| 3,864,866 | * | 2/1975 | Kosinsky | 43/58 |
| 4,052,811 | * | 10/1977 | Shuster | 43/136 |
| 4,787,171 | * | 11/1988 | Dagenais | 43/137 |
| 4,800,671 | * | 1/1989 | Olson | 43/108 |
| 4,905,408 | * | 3/1990 | Wu | 43/137 |
| 5,634,293 | * | 6/1997 | Mile | 43/136 |
| 6,044,584 | * | 4/2000 | Lynn | 43/136 |

FOREIGN PATENT DOCUMENTS

2468305 * 5/1981 (FR) ..................................... 43/114

* cited by examiner

*Primary Examiner*—Kurt Rowan
(74) *Attorney, Agent, or Firm*—Andrew C. Aitken

(57) ABSTRACT

A device for manually capturing and restraining intended insects, the same comprising a pad of stacked, singular sheets each sheet having a partial enveloping means comprised of hydrophillic absorbing material and collapsible sheet construction whereby the sheet partially conforms in response to the insects body mass. Each sheet has a region is coated with a mild compression adhesive material capable of trapping of an insect in response to the physical manipulation by a human being. The pad of stacked adhesive sheets can be used by separating each sheet individually or as a stack. Upon apprehension of an insect, the sheet restraining the insect is separated, if not already separated from its stack, folded to encase the insect and ready for disposal. The pad of stacked adhesive sheets can have various sheet sizes, thickness and density with varying enveloping ability—all depending upon intended insect to be trapped. For increasing the maneuverability of the device, the device can be attached to an elongated rod such as a fly swatter's handle.

3 Claims, 5 Drawing Sheets

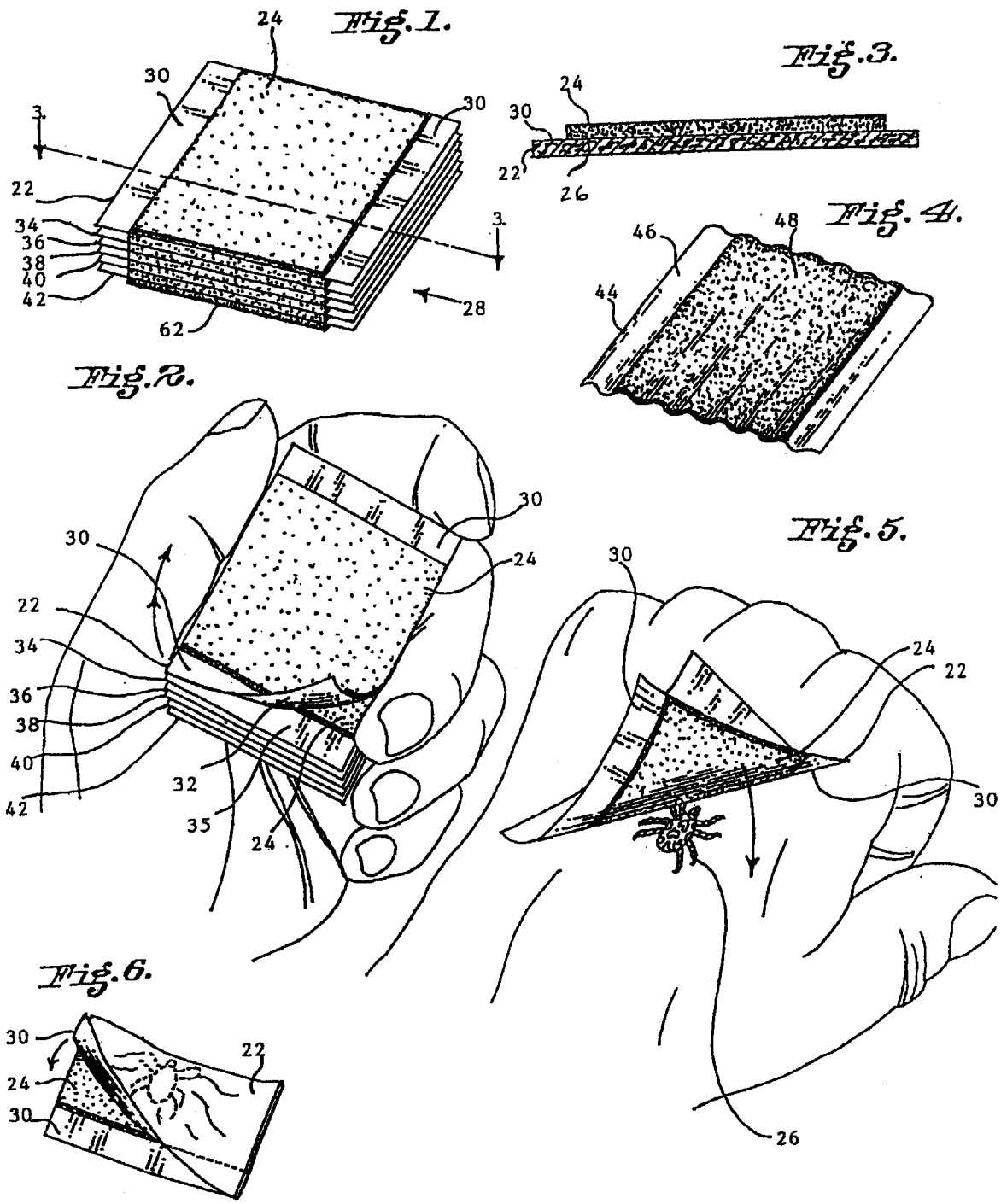

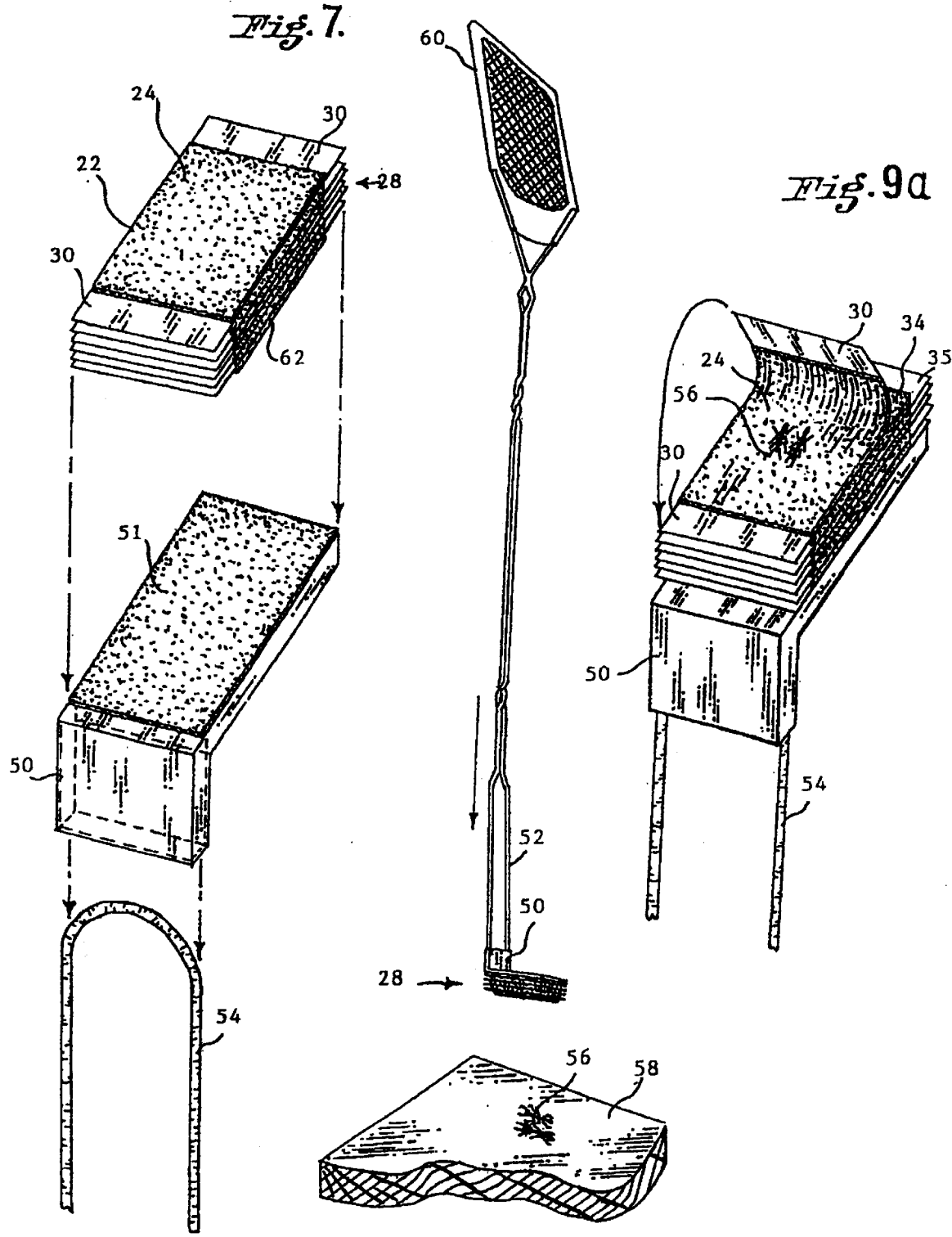

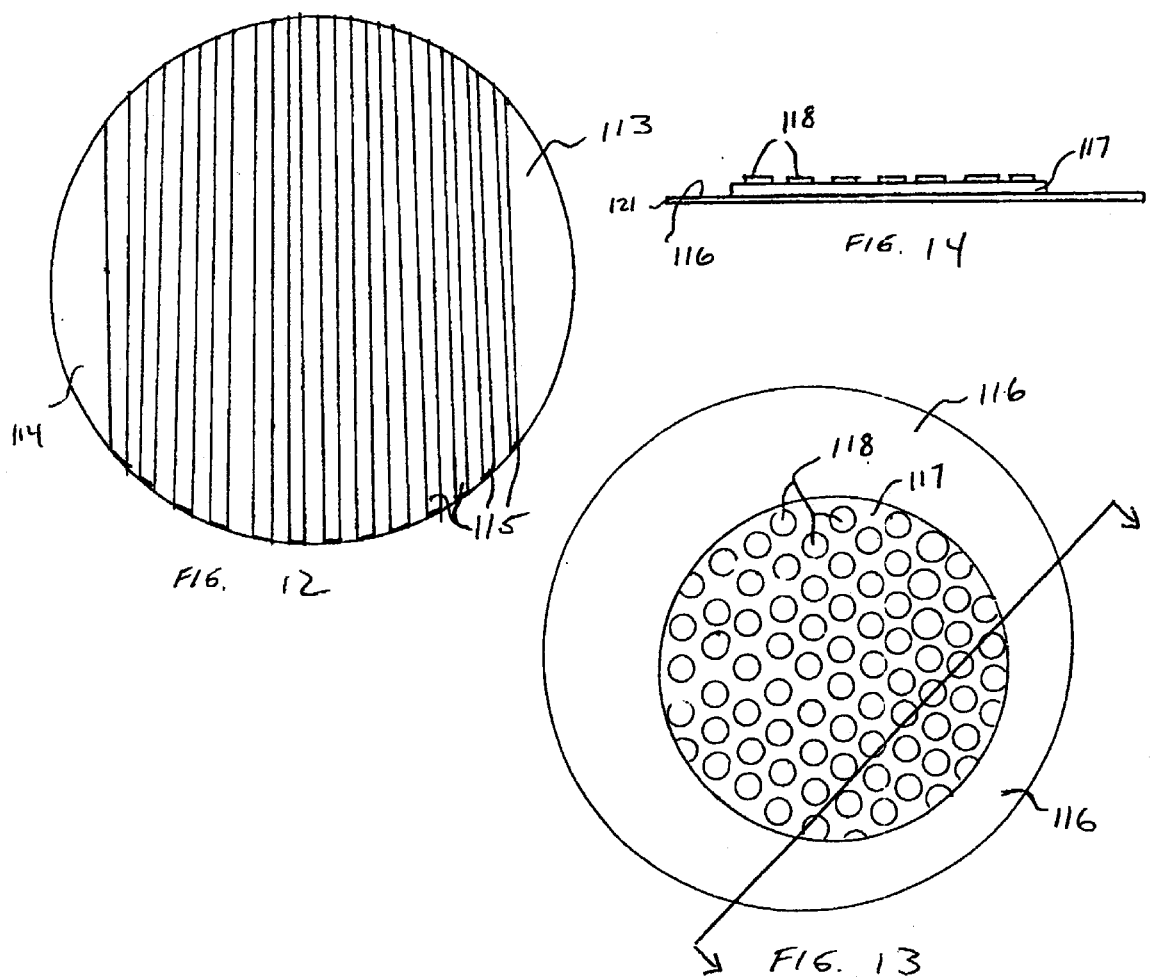

CAPTURING DEVICE FOR INSECTS

RELATED APPLICATIONS

This is a continuation in part application of application Ser. No. 08/832,384 filed on Apr. 2, 1997, now abandoned.

BACKGROUND OF THE INVENTION

This invention relates to a device for capturing insects or other small pests. The invention further involves a method of use of the device which is particularly effective for the manual capture of insects when an individual is faced with a personal and proximate encounter.

Many, if not most, people have had experiences dealing with a personal encounter with insects or other pests where the insect is discovered either crawling on or near one's person. The presence of an insect or pests is particularly undesirable when found within one's home, automobile or other confined space. Common insects and other pests which are frequently encountered may include ticks, spiders, ants, flies, bees, wasps, scorpions, crickets, beetles and grasshoppers. Consumers would welcome a device which would enable them to catch and restrain such insects and pests without having to physically touch or handle the insects directly. Direct contact with such insects and pests is undesirable because they may bite or sting. Moreover, insects and pests may serve as carriers of disease or harmful germs. Brushing insects off or dropping the insect onto the floor is unsightly, does not restrain the insect and does not address the disposal problem. Swatting insects is often undesirable because the action will frequently leave a residue of the insect on the surface and also makes the disposal of the insect inconvenient. Furthermore, in circumstances where in the insect or pest is not resting on a hard surface, swatting the insect may not be effective. Swatting an insect may also leave a residue, such as blood, from the insect on the flyswatter which is also undesirable. The use of insecticides is likewise disfavored because of the hazardous nature of the chemicals used and the possible adverse health and environmental effects associated with pesticides.

According to the invention, insects are manually captured by attachment to a pressure responsive adhesive which has been provided on a pliable and compressible substrate in a sheet form. The sheet material has enveloping abilities which enables it to be folded over on itself so that a captured insect may be wrapped up and then appropriately disposed. The sheet according to the invention is constructed to be a convenient size for carrying and handling. After the insect is restrained and wrapped up in the sheet, it can then be conveniently and properly disposed of in the same manner as any other article of garbage. The insect may also be saved for inspection by a physician or other professional if there is concern that it is a poisonous or otherwise dangerous insect or pest.

The substrate can be made in a variety of sizes and configurations depending on the particular insect targeted. For example, in some parts of the country ticks are increasingly becoming a health problem, particularly in the Eastern United States. In this regard, certain ticks are potentially dangerous to humans and animals may carry harmful diseases including spotted fever and lyme disease. Often a user will want to be able to identify the species of the tick but there is no convenient and safe manner to trap and restrain the tick for further observation and identification by experts. Likewise, some regions of the United States experience heavy infestations of ants upon the change of seasons and, particularly in areas where food is prepared, the use of insecticides is undesirable. The substrate can thus be configured for the optimal capture of ants.

Accordingly, an object of the present invention is to provide a manually manipulated capturing device that employs pressure sensitive adhesive for the capture of insects or other small pests.

A further object of the invention is to provide a device which has an adhesive coated sheet with restraining capability only after the said adhesive portion of the sheet is pressed firmly against an intended insect, compressing and adhering the insect onto the adhesive.

A further object of the invention is to provide a manual insect capturing device which includes a pad of disposable stacked adhesive sheets with tabs allowing easy sheet separation, as intended insects are captured and restrained, the sheets being further used as a medium for wrapping the captured insect in preparation for its proper disposal.

A further object of the invention is to provide a manual insect capturing device that is absorbent and can collapse in response to the insects body thus reducing the smashing or squashing effect that occurs when an insect is sandwiched between a rigid article and a hard surface.

A further object of the invention is to provide the material or pad holder on the end of an elongate rod, such as a fly swatter handle, thereby providing a means for extension of the device's reach, greatly increasing the versatility of the device in the pursuit and apprehension of the intended insect or pest.

A further object of the invention is to provide means to post the manual insect capturing device in the user's home, car, or other convenient location.

Yet a further object of the invention is to provide a manual insect capturing device that can be conveniently carried by the user, in places such as pockets, backpacks and purses, enabling the device to be readily accessible for those times when, unexpectedly, insects are discovered crawling on or around ones person, their children or pets.

It is yet a further object of the invention to provide a manual insect capturing device that requires a minimum of skill and training to use and manipulate is inexpensive and effective.

A further object of the invention is to provide a manual insect capturing device that makes available a safe sanitary method for insect handling and disposal and to make the device available to the consumer in various sheet sizes and densities to accommodate different types, sizes and quantities of which are likely to be encountered by the user in their particular environment.

These and other various objectives and advantages of the invention will become apparent to the reader from a consideration of the following description and accompanying drawings.

BRIEF DESCRIPTION OF THE DRAWINGS

FIG. 1 shows a perspective front view of a stack of adhesive coated sheets in accordance with the invention.

FIG. 2 shows a perspective view of the stack depicted in FIG. 1 with the top sheet being partially separated from the stack held by a user.

FIG. 3 is side sectional view of a single sheet such as that shown in FIG. 1 taken along line 3—3.

FIG. 4 shows a perspective front view in elevation of a second embodiment of the invention having a corrugated design.

FIG. 5 shows a perspective view of a singular sheet made in accordance with the invention in use, with the tacky adhesive portion facing down shown making adhesive contact with a wood tick.

FIG. 6 shows a perspective view of such a sheet made in accordance with the invention folding over a restrained insect.

FIG. 7 shows an exploded view of the assembly of a stack of adhesive sheets and their integration with a pad holder on the end of a flyswatter.

FIG. 8 shows a perspective view of the assembly depicted in FIG. 7 on the handle of a flyswatter positioned above targeted insects.

FIG. 9a shows a perspective view of such a stack of sheets according to the invention, showing the initiation of the folding of a sheet and over the apprehended insects.

FIG. 12 is a top view of a further embodiment of the invention.

FIG. 13 shows a top view of a further embodiment of the invention.

FIG. 14 shows a side view in elevation of the embodiment of the invention shown in FIG. 13.

DESCRIPTION OF THE PREFERRED EMBODIMENTS

Figure 9B:
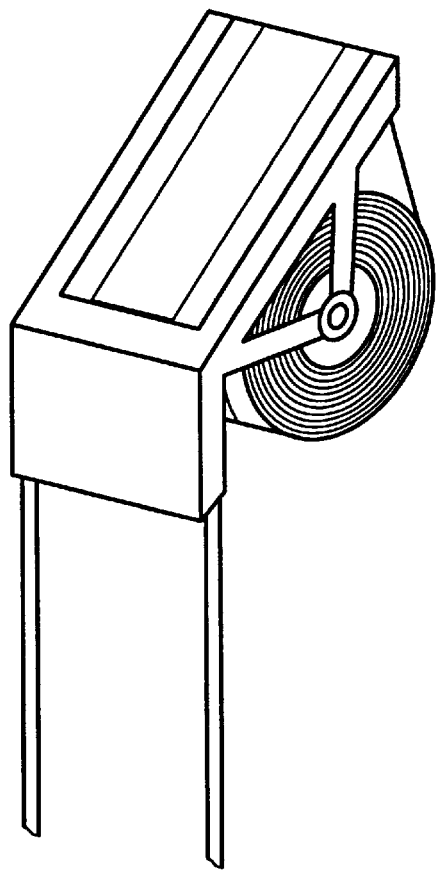
FIG. 9b shows an alternate embodiment of the device.
Figure 16:
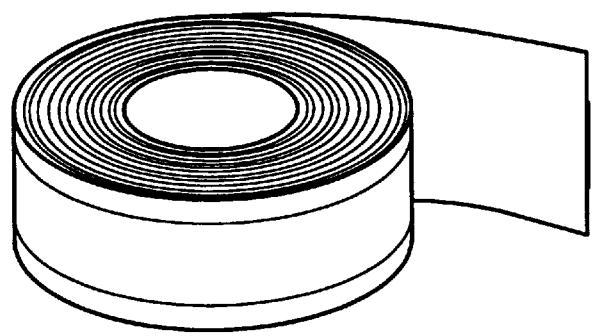
FIG. 16 shows a roll of the adhesive sheets.

Referring now to FIG. 1, a pad of adhesive sheets generally designated by the reference numeral 28 is shown. In this first embodiment each sheet is approximately 1/16 inch thick and comprised of a low density paper substrate 22. As best seen in FIG. 2 sheet 22 has an upper surface 30 and a lower surface 26. Displaced upon a region of upper surface 30 is an adhesive 24 which has similar properties to those adhesives found on conventional clear cellophane tapes. The range of adhesives generally acceptable for use with the invention are similar to those found on conventional Post-it brand tabs manufactured by 3M Company to those found on conventional masking tapes. The preferred contemplated adhesives include those pressure sensitive which form a bond on contact. Adhesives which could be effectively used in accordance with the invention have tackiness properties that range from those used in on conventional masking tape to those on the post it notes and accordingly the bond sought is not required to be particularly strong or permanent. As best seen in FIG. 1 the regions 30 devoid of adhesive on the top surface of the sheets are provided along a least two peripherial edges so that the sheet may be easily manipulated without adhering to the users hands. Preferably the region devoid of adhesive is located on opposite sides of the sheet as illustrated in FIG. 1. Providing such areas allows the users to easily separate the sheets as seen in FIG. 2. and, when in use, provides an area which will not adhere to the surface which is contacted by the adhesive, facilitating the removal of the sheet from the surface. When used, sufficient force is applied to the adhesive pad to merely engage the insect. The user tries to avoid application of significant force on surface which the insect is found and thereby tries to avoid a strong bond between the surface and the adhesive. The presence of the trapped insect between the substrate and the surface further serves to minimize the contact between the adhesive and the surface and accordingly the bonding between the adhesive and the surface is diminished. Substrate 22 is comprised of a low density, hydrophillic paper made of a porous mesh fiber construction which is rigid enough to support its own weight when held by region 30.

FIG. 4 depicts a further embodiment of the invention where the substrate is comprised of a corrugated fiber material. The use of corrugation serves as an alternative manner in which to provide a compressible substrate. The use of this configuration also may provide an increased frictional engagement on the insect. Like the previous embodiment an adhesive is provided on a portion of one side of the substrate. It is contemplated that the adhesive would be placed in the depressed regions or crevices formed by the corrugated material. In this embodiment the device would be less likely to firmly adhere to the surface on which the insect is found, yet, adhesive within the crevices formed by the corrugation would still effectively engage the insect, or portions of the insect.

Figure 10:
FIG. 10 is a sectional view in elevation of a sheet according to the invention.
Figure 11:
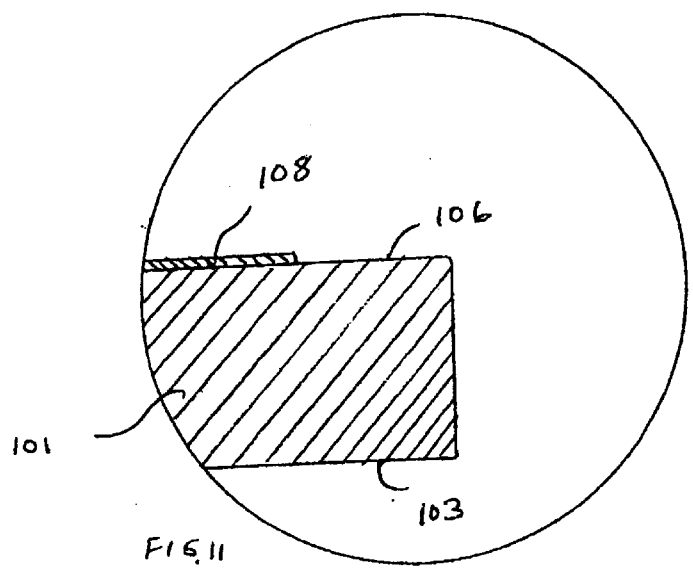
FIG. 11 is an enlarged sectional view in elevation of the sheet depicted in FIG. 10.

FIGS. 10 and 11 shows a further embodiment of the invention with a wax paper cover 110 or other similar non-porous non-stick sheet placed on top of the adhesive which seals the adhesive preventing it from drying out, protects the adhesive and prevents it from adhering to extraneous matter until the sheet is ready for use. In this embodiment the devices is provided to the user is the form of individual sheets. When the device is provided in the pad embodiment as disclosed as FIG. 1, a non-stick coating can be provided on the bottom side 26 of each sheet which serves this same purpose. The non-stick coating may also be provided in the form of a laminate layer.

FIG. 12 depicts a top plan view of a further contemplated embodiment where the profile of the is circular rather than a square. In this embodiment the lateral region 113 and 114 are devoid of the adhesive and the adhesive is provided in a series of stripes across the top surface rather than being dispersed throughout the entire central adhesive region. By providing the adhesive on the substrate in this manner the adhesive does not significantly interfere with the hydrophilic properties of the substrate. Application of the adhesive to only a portion of the surface of the substrate is nevertheless effective at restraining an insect and conserves the amount of adhesive required. FIG. 13 shows another embodiment of the invention, in this embodiment the region devoid of adhesive 16 is provided around the entire periphery of the device. A best seen in FIG. 14, this area is on a laminate layer 121 and not provided on the hydrophillic compressible substrate 117 which is essentially coextensive with the adhesive areas. Like the embodiment set forth in FIG. 12, the adhesive 118 does not completely cover substrate 117 but rather is provided in the form of small circular regions. Although the distribution of the adhesive has been disclosed as stripes and circular regions, it is contemplated that the adhesive may be provided in a wide variety of manners which would not effect the performance of the device. For example, it is contemplated that the adhesive could be provided in the form of a grid, checkerboard, or in small droplets randomly dispersed across the surface of the substrate.

Figure 15:
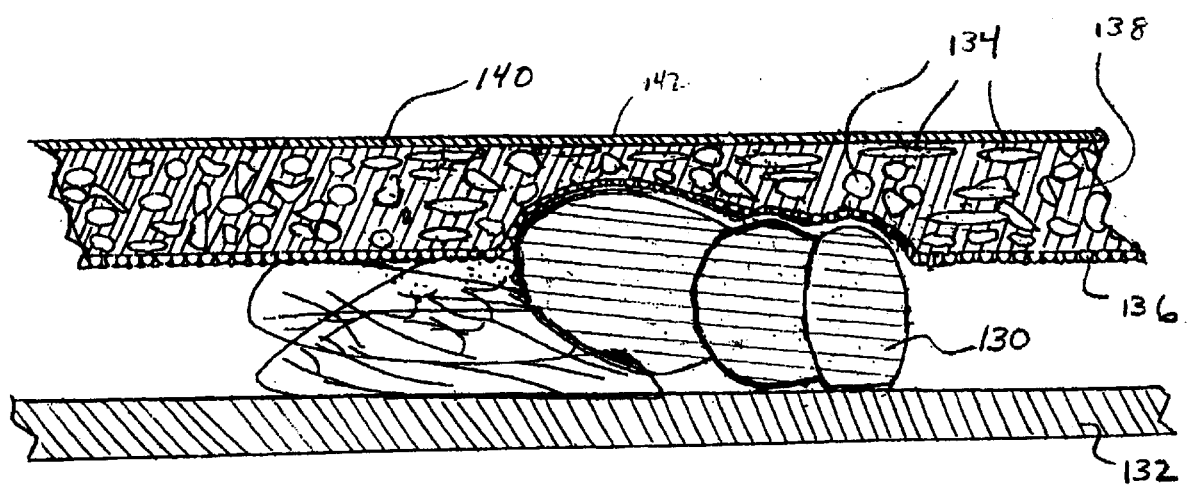
FIG. 15 shows a side sectional view of a further embodiment of the invention in engagement with an insect against a hard surface.

FIG. 15 shows yet another embodiment of the invention in engagement with an insect 130 and between a hard surface 132 such as a floor or wall. In this embodiment air cavities 134 are distributed throughout the substrate 138 which enables the substrate to be compressed in response to force applied from the bottom surface 142 of the device. The substrate has an adhesive layer 136 formed by application of droplets across the top surface. The matrix is made of a low density paper or cellulose and is hydrophillic. It is contemplated that other materials could also be satisfactorily be employed such as synthetic resins and when such synthetic resins are employed the resiliency feature of the substrate is enhanced. This embodiment is provided with a third layer 140 to increase the rigidity of the substrate. In this embodiment the is made of thin cardboard having a rigidity analogous to that of a conventional index card.

It is contemplated that alternative materials may be sued as the compressible substrate such as synthetic resin which is partially elastic and compressible or can collapse across an axis perpendicular with the planar surface on which is provided the adhesive.

The rigidity feature must be sufficient to allow a user to apply pressure from the opposite side of the substrate to crush and capture the insect. The device should preferably have a rigidity at approximately equal to that of the cardboard used in conventional commercially available index cards. Because the substrate is relatively thick compared to conventional paper, there is a more substantial barrier to between the insect and the individual using the material which serves to protect the user. In the embodiment the protective barrier is further enhanced by layer 140. Thus when the intended target is a bee, wasp or other biting or stinging insect, the material used for the sheet is thick enough to prevent the user from harm.

A further feature of the invention, related to the thickness and compressibility of the substrate, is the ability of the substrate to absorb liquid residue from the insect. Any liquid from the insect or pest can be adequately absorbed by the material and any residue which may remains of the surface where the insect had landed is minimized. In this regard the substrate in each of the embodiments is made of a hydrophillic material. Because the presence of adhesives on the surface of the substrate may interfere with this feature of the invention, in order to optimize this feature, in some of the preferred embodiments the adhesive is intermittently applied over the surface of the substrate, rather than in a continuous coating so that a portion of the underlying substrate remains exposed.

The ability of the substrate to be compressed serves to increase the total surface area between the insect and the adhesive coated surface and the insect can therefore be more effectively trapped and restrained.

A further feature of the invention is the ability of the substrate to fold over upon itself. Accordingly, each of the substrate describe herein has pliable characteristics which enable a user to easily fold the substrate over upon itself to envelope the insect or pest therein. The substrate is maintained in a closed position by the engagement of the opposite adhesive surfaces contacting one another. Folding the substrate up increases the contact area between the adhesive and the insect and serves to further prevent the possibility that the pest may free itself from the adhesive. Folding the substrate essentially encapsulates the pest within the adhesive and will ensure that it cannot escape.

In the contemplated preferred embodiments the sheets are opaque which serves to obstruct and minimize the viewing which is an desirable feature in circumstances where the individual using the device has a fear of insects or when the crushed insect is unsightly. It is further contemplated that the devices can be provided with appealing graphics, educational information relating to insects or information relating to the method of use.

The use of the device involves application of the adhesive to an insect crawling along surface. The portion of the substrate provided with adhesive is pressed against the insect as shown in FIG. 15. Application of pressure causes the insects body to create a small depression or cavity within the substrate and increases the total surface areas between the adhesive agent and the insect. When the substrate is then is then removed from the surface the insect will adhere to the adhesive substrate. Because in most instances the targeted insects will have significantly less mass than the surface on which it is crawling, and the insect will generally have a higher affinity to the adhesive than a smooth flat surface. Likewise, the substrate is particularly useful to engage and capture the an insect found on the skin of a person as shown in FIG. 5 because the adhesive will generally have less adhesion to the skin of an individual dues presence of oils on the body. In FIG. 5 a substrate 22, and more particularly the adhesive portion 24 is applied over tick 26 which was located on the hand of a user. Upon removal of the substrate from the surface the insect will be retained by the adhesive. Next, as shown in FIG. 6, the entire device is folded in half and the adhesive which remained exposed is allowed to engage itself and completely encapsulate the pest or insect. If the application of the pressure on the insect during the initial capture phase was not sufficient to kill the insect or pest, the further pressure can be applied to ensure the insect is indeed dead.

In each of the embodiments the device is engineered so that when pressed against the body of an insect, when on a hard surface such as wood, plaster or concrete, the substrate will generally conform to the body of the insect when pressure is applied to the insect from the bottom side devoid of adhesive. In alternative embodiments the bottom side of the device is provided with a additional material to further provide rigidity to the rear surface which increases the protective barrier. Preferably the bottom side of the substrate is water proof or water resistant and this feature will prevent any liquid residue from the crushed insect from migrating through the substrate from the to side to the bottom side where the is engaged by the hand, or could leak through to the next sheet. This feature maintains a barrier which ensures that the individual does not come into direct contact with the residue of the insect and, in connection with the pad embodiment keeps the next substrate in new condition.

In a further embodiment of the invention, the substrate is provided in combination with a conventional flyswatter or other elongate handle. Providing the substrate in combination with a flyswatter is useful for engagement of insects or pests which have been initially killed by flyswatter head and then must be disposed. The device may further be used as an alternative to a flyswatter in circumstances were the use of a flyswatter is not possible due to the location of the pest or when the insect is slow moving and a flyswatter is not required on. As seen in FIG. 8, in this embodiment a pad consisting of a plurality of the substrates such as described in FIG. 1 is combined with rigid support member 50. Rigid support member 50 serves the purpose of the rigid support provided individually on the sheets as shown as a laminate layer 140 in FIG. 15. Support member 50 is attached to rod 52, in this case, the opposite end or handle end of a conventional flyswatter. The device may be operated using a stamping action on the insects crawling on surfaces when it is not necessary to employ the speed of flyswatter head or in circumstances where there is insufficient room to swing the flyswatter head. Rod 52 serves to provide distance between the user and the target insect and accordingly serves to alleviate fear in those persons who have an aversion to insects. Providing the substrate on a rod also makes the use of the device more convenient when the targeted insect are found crawling on the floor. The device as depicted in FIGS. 7–9 is particularly useful and effective for picking up ants and flying insects which have been killed by a flyswatter and have subsequently dropped to the floor. Combining the product with the flyswatter further results in a convenient, effective and multipurpose pest control and disposal tool. The pad 28, as shown in FIG. 7 is adhered to the support member 50 by an adhesive 51. In other contemplated alternative embodiments the substrate is held in place by mechanical means such as a frictional engagement, such as a tongue and groove arrangement or, the pad can be provided with a base which can be snap fit into a complimentary flange structure provided on holder 50.

The manual insect capturing device of FIG. 1 can be used to capture a wide variety of insects, large and small. The device is easy to carry. The user will find this device useful when exposed to the habitats of annoying insects such as wood tics, but it will be equally useful attached to the handle of a fly swatter. The said attachment enables device extension from the user's hand as shown in FIG. 8 augmenting manual manipulation, greatly increasing device versatility, reaction time and speed during pursuit and apprehension of an insect.

In operation, the user optionally separates the top sheet 22 from its stack 28. The operator then places the tacky portion 24 directly over the intended insect 26 and makes contact. The user then causes further compression on the insect allowing the adhesive to engage the insect. The adhesive catches and holds the insect. Next the adhesive coated material is folded over to envelope the insect and the insect is ready for proper disposal.

In an alternative embodiment shown in FIG. 7 the user employs the device by adhesion attachment onto a pad holder 50 connected to the end portion a fly swatter's handle 52 or other appropriate device which serves as a means of extension for amplification of manual manipulation of the device 28 whereby the user repeats the process of compression adhesion, capturing and restraining and disposing of the intended insect.

It is contemplated that additional variations of this invention may be made without departing from the principle thereof, and I do not wish to be understood as limiting myself to the specific construction shown and described herein. Those who are skilled in the art will envision many other possible variations still within its scope. For example, the means by which the enveloping of an insect's body mass takes place. This could be accomplished not only by a sheet, but through a variety of methods using elastic materials, fabrics, plastics or rubbers in place of the paper sheet, also mixing elastic material with the adhesive that coats the sheet. The sheet construction is a singular method of envelopment with many potential variations; For example, one may be constructed with a singular pocket, multiple pockets or elongated pockets—all of which are formed, impression constructed. Variations could occur in the density and thickness, multiple material layering, or trapping air pockets, all of which allow insect body mass and sheet to conform to one another as a result of compression of the void space within the sheet. The shape of the sheet could be elongated to that of a strip or a roll. Insect poisons and/or anti-bacterial agents could be added to the adhesive of the sheet. Different cover methods could be added to protect the device sheet and adhesive prior to use. Accordingly, the reader is requested to determine the scope of the invention by the appended claims and their legal equivalents, and not by the examples which have been given.

What is claimed is:

1. A device for capturing insects comprising an elongate handle with a flyswatter head provided on a first end of said elongate handle, said head being flexible and having openings to allow for air to flow through said head, and means to rigidly retain a support member for a substrate on an opposite end of said elongate handle, said substrate further comprising a surface coated with an adhesive, wherein said support member allows for the transmittal of force from said elongate handle to a rear of said substrate allowing engagement of a environmental surface by said surface coated with adhesive wherein said surface coated with adhesive can engage an insect.

2. The device recited in claim 1 wherein said device further comprises a plurality of planer substrates, said substrates oriented on top of one another in a pad arrangement.

3. The device recited in claim 1 wherein said device further comprises a roll and said support member provides an area where a portion of said roll can be supported in a planar arrangement for the engagement of an insect.

* * * * *